US010484198B2

(12) United States Patent
Krumsiek

(10) Patent No.: US 10,484,198 B2
(45) Date of Patent: Nov. 19, 2019

(54) FUNCTION CONNECTION UNIT COMPRISING A PARAMETER MEMORY

(71) Applicant: Phoenix Contact GmbH & Co. KG, Blomberg (DE)

(72) Inventor: Dietmar Krumsiek, Emmerthal (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 15/535,979

(22) PCT Filed: Dec. 15, 2015

(86) PCT No.: PCT/EP2015/079851
§ 371 (c)(1),
(2) Date: Jun. 14, 2017

(87) PCT Pub. No.: WO2016/096892
PCT Pub. Date: Jun. 23, 2016

(65) Prior Publication Data
US 2017/0366370 A1    Dec. 21, 2017

(30) Foreign Application Priority Data

Dec. 18, 2014  (DE) .................. 10 2014 119 101

(51) Int. Cl.
*H04L 12/40*         (2006.01)
*G06F 13/364*        (2006.01)
(Continued)

(52) U.S. Cl.
CPC .... *H04L 12/40019* (2013.01); *G05B 19/0423* (2013.01); *G06F 13/364* (2013.01);
(Continued)

(58) Field of Classification Search
None
See application file for complete search history.

(56) References Cited

U.S. PATENT DOCUMENTS 6,838,852 B1 * 1/2005 Namuduri .......... G05B 19/0423
                                                318/434
7,752,025 B2 * 7/2010 Becker ................. G05B 19/042
                                                703/13
(Continued)

FOREIGN PATENT DOCUMENTS

DE    10 2009 00662 A1    7/2010
GB         2403042 A  * 12/2004 ......... G05B 19/0426
WO    WO 2013/178210 A1   12/2013

OTHER PUBLICATIONS

'Instruction Manual—colorCONTROL Software S' by Micro-Epsilon, archived from Aug. 1, 2012.*
(Continued)

*Primary Examiner* — Steven G Snyder
(74) *Attorney, Agent, or Firm* — Holland & Hart LLP

(57) ABSTRACT

The present disclosure relates to a function connection unit for connecting functional modules. The functional connection unit includes a plurality of functional module terminals configured to connect to the functional modules and to communicate according to a first communication protocol, and a parameter memory that includes parameter data for device specific parameterization of at least one functional module. The parameter memory is configured to connect to a functional module terminal of the plurality of functional module terminals. The function connection unit is configured to read the parameter data from the parameter memory. The function connection unit is also configured to parameterize at least one functional module in a device-specific fashion based at least in part on the read parameter data.

19 Claims, 3 Drawing Sheets

(51) Int. Cl.
*G06F 13/38* (2006.01)
*G05B 19/042* (2006.01)

(52) U.S. Cl.
CPC ...... *G06F 13/385* (2013.01); *H04L 12/40032* (2013.01); *H04L 2012/4026* (2013.01)

(56) References Cited

U.S. PATENT DOCUMENTS

| | | | | |
|---|---|---|---|---|
| 8,205,022 | B2* | 6/2012 | Isenmann | H04L 41/0806 710/305 |
| 8,219,790 | B2* | 7/2012 | Chomik | G05B 19/0423 700/17 |
| 8,588,943 | B2* | 11/2013 | Wegener | G05B 19/0426 700/12 |
| 2007/0255520 | A1* | 11/2007 | Becker | G05B 19/042 702/127 |
| 2008/0228290 | A1* | 9/2008 | Kalhoff | G05B 19/056 700/17 |
| 2010/0121999 | A1* | 5/2010 | Isenmann | H04L 12/40006 710/105 |
| 2010/0179669 | A1* | 7/2010 | Wegener | G05B 19/0426 700/12 |
| 2017/0242601 | A1* | 8/2017 | Rantanen | G06F 3/0619 |
| 2018/0046589 | A1* | 2/2018 | Ozturk | G06F 13/102 |
| 2018/0113429 | A1* | 4/2018 | Krumsiek | G05B 19/0423 |

OTHER PUBLICATIONS

English Machine Translation of DE 10 2009 006 662 A1.*
IO-Link Interface and System—Specification; Version 1.1.2; Order No. 10.002; Jul. 1, 2013; 262 pgs.

* cited by examiner

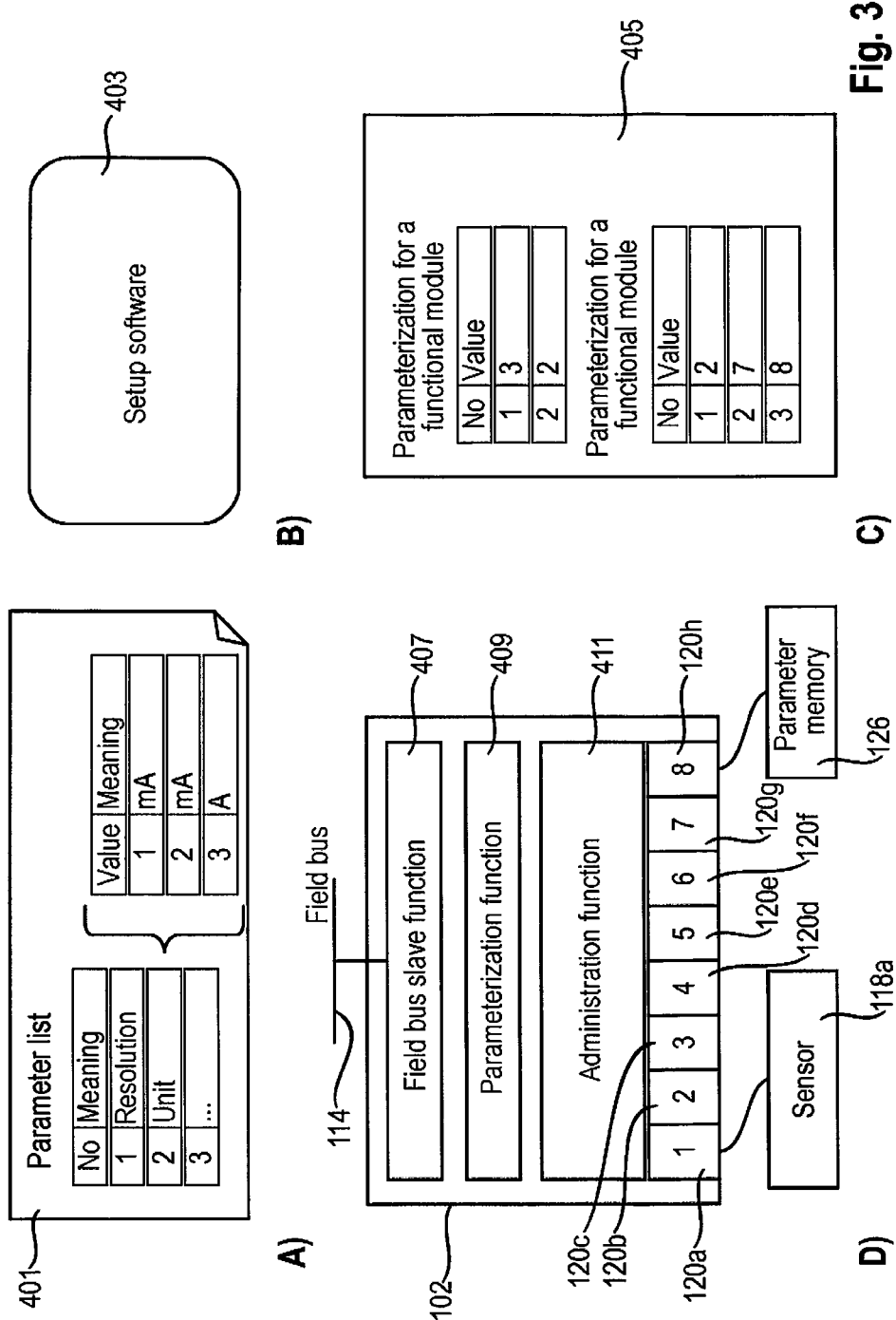

FUNCTION CONNECTION UNIT COMPRISING A PARAMETER MEMORY

CROSS-REFERENCE TO RELATED APPLICATIONS

This application is a 371 national phase filing of International Application No. PCT/EP2015/079851, entitled "FUNCTION CONNECTION UNIT COMPRISING AP ARAMETER MEMORY", filed 15 Dec. 2015, which claims priority to German Patent Application No. 10 2014 119 101.3, entitled "FUNKTIONSANSCHLUSSEINHEIT MIT EINEM PARAMETERSPEICHER", filed 18 Dec. 2014.

BACKGROUND

The present disclosure relates to a function connection unit comprising a parameter memory.

In order to connect and configure functional modules for automation technology such as actuators or sensors, function connection units, also referred to as I/O masters, which operate, for example, according to the single-drop digital communication interface for small sensors and actuators (SDCI) protocol, are generally used. An example of an SDCI function connection unit is the an input/output (I/O) link master which is described, for example, in DE 10 2011 006590 A1.

However, the functional modules which are connected to a function connection unit have to be parameterized, that is to say configured in a device-specific fashion, for the desired mode of operation. This is generally done by parameterizing the functional modules, wherein, for example, sensor sensitivities can be set. The parameterization of the functional modules is generally carried out by means of a specific service interface in advance by means of a service technician, but this entails a high degree of expenditure.

SUMMARY

The object of the present disclosure is therefore to provide a more efficient concept for connecting functional modules in automation technology.

The object is achieved by means of the subject matters having the features according to the independent claims. Advantageous examples are the subject matter of the dependent claims, of the description and of the drawings.

The present disclosure is based on the realization that the functional modules can be parameterized automatically by a function connection unit if a parameter memory is used with parameter data which describe or specify the parameters. The parameter memory can be connected to a functional module terminal to which a functional module is generally connectable. In this way, the need for a specific service interface for parameterizing the functional modules is eliminated. Furthermore, the function connection unit can automatically parameterize the functional modules on the basis of the parameter data provided by the parameter memory.

The parameter data can be produced on the basis of a general parameter data description which lists parameterizable parameters and is present, for example, in the form of an XML file, for example by a user by means of a computer and, if appropriate, setup software.

According to a first aspect, the disclosure relates to a function connection unit for connecting functional modules. The function connection unit has a multiplicity of functional module terminals to which the functional modules are connectable for communication according to a communication protocol, and a parameter memory with parameter data for device-specific parameterization of at least one functional module, wherein the parameter memory is connectable to a functional module terminal of the multiplicity of functional module terminals, and wherein the function connection unit is configured to read the parameter data from the parameter memory and parameterize at least one functional module in a device-specific fashion on the basis of the read parameter data.

The parameter data permit device-specific parameterization or configuration of the functional modules. The parameter data can specify, for example, technical sensitivities, switching delays, characteristic curves or value ranges of the functional modules. Furthermore, the parameter data can specify information for identifying the functional modules, process data and diagnostic data, communication properties and the setting up of the user interface in engineering tools. The parameter data can be present in the form of one or more files, e.g. a main file and an optional external voice file, for example in the XML format. The parameter data can also comprise image files in the PNG format. In the context of the I/O link technology, the parameter data can be present in an I/ODD (I/O device description) file.

The functional modules are, for example, sensors or actuators according to the standard IEC 61131-9.

This provides the technical advantage that in order to parameterize the functional modules, for example sensors or actuators, there is no longer any need to provide a specific service interface. Furthermore, an external communication connection, such as for example a field bus, is not necessary to parameterize the functional modules.

The communication protocol can be a communication protocol according to the I/O link or "single-drop digital communication interface for small sensors and actuators (SDCI)". The I/O link is a point-to-point interface for the functional module connection of any desired sensor system and actuator system to, for example, a control system. According to SDCI, functional modules, such as e.g. sensors and/or actuators, are connected in accordance with the standard IEC 61131-9.

In one advantageous example, the function connection unit is a master according to the SDCI protocol, in particular an I/O link master. It is therefore possible to connect intelligent functional modules, such as e.g. sensors and/or actuators, according to the standard IEC 61131-9.

In a further advantageous example, the parameter memory is configured to output a characteristic signal which identifies the parameter memory, wherein the function connection unit is configured to detect the parameter memory at the functional module terminal or to differentiate it from a functional module on the basis of the characteristic signal. The characteristic signal can comprise, for example, a bit pattern, which indicates the parameter memory connected to the functional module connection instead of a functional module. In this way, the function connection unit can detect that a parameter memory is connected to the functional module terminal instead of a functional module and can read out the parameter data from the parameter memory via the functional module terminal. As a result, a simple detection of the parameter memory at the functional module terminal is made possible, so that a specific service interface can be eliminated.

In a further advantageous example, the function connection unit is configured to read the previously stored parameter data from the parameter memory, in order to parameterize in a device-specific fashion the at least one functional module terminal to which the at least one functional module is connected. This provides the technical advantage that the parameter data do not have to be fed via a field bus of the function connection unit.

In a further advantageous example, the parameter memory is configured to transmit the parameter data from the parameter memory to the function connection unit via the functional module terminal.

In a further advantageous example, the function connection unit is configured to store the read parameter data. As a result, the parameter data can be removed, as a result of which the functional terminal which was previously occupied by the parameter memory is free for a further functional module. The further functional module can be parameterized using the parameter data stored in the function connection unit.

In a further advantageous example, the parameter memory can be detached from the functional module terminal, wherein a functional module is electrically connectable to the functional module terminal, and wherein the function connection unit is configured to parameterize in a device-specific fashion, using the parameter data stored in the function connection unit, that functional module which is connected to the functional module terminal instead of the parameter memory.

In a further advantageous example, the parameter memory is configured to set up a data transmission connection for transmitting the parameter data from the parameter memory to the function connection unit.

In a further advantageous example, a functional module is connected or is connectable to the parameter memory, wherein the function connection unit is configured to parameterize in a device-specific fashion, on the basis of the parameter data, the functional module via the functional module terminal to which the parameter memory is electrically connected. The parameter memory is connectable to the functional module in a permanent or disconnectable fashion. In this way, the functional module of the parameter memory can be operated via the functional terminal to which the parameter memory is also connected, without disconnecting the parameter memory.

In a further advantageous example, the parameter memory can be switched into a transparent mode in which data from the function connection unit can be passed on to the at least one functional module via the parameter memory and/or data can be passed on from the at least one functional module to the function connection unit by the parameter memory, in order to parameterize in a device-specific fashion the functional module which is connected to the parameter memory. It is therefore not necessary to remove the parameter memory in order to permit operation of the functional module which is connected to the parameter memory.

In a further advantageous example, the function connection unit is configured to switch the parameter memory into a memory write mode in which data is writable to the parameter memory.

In a further advantageous example, the function connection unit is configured to bring about a changeover of the parameter memory, which is in the transparent mode into a memory write mode in which data is writable to the parameter memory. This provides the technical advantage that a renewed changeover of the operation mode is possible. This increases the flexibility.

In a further advantageous example, the function connection unit is configured to interrupt, during the memory write mode, a data transmission connection for transmitting data between the function connection unit and the at least one functional module. This provides the technical advantage that after the reading of the parameter memory a memory of the parameter memory can be used to store further data, e.g. in order to expand a memory of the function connection unit. The memory requirement of the function connection unit is therefore reduced.

In a further advantageous example, the parameter memory has an interface for transmitting data according to a second communication protocol. This provides the technical advantage that data, such as e.g. functional module parameter data, can be written to and/or read from the memory of the parameter memory via a further interface. This increases the ease of handling. The first and the second communication protocol are different in this context.

In a further advantageous example, the second communication protocol is a USB protocol. This provides the technical advantage that a widespread and reliable interface is provided for the transmission of data.

In a further advantageous example, the parameter memory has an operator control element with which transmission of the parameter data from the parameter memory into the function connection unit is triggerable. This provides the technical advantage that an interruption of the data transmission connection can be canceled again so that data can be transmitted again via the data transmission connection from the protocol data set to the function connection unit and vice versa. The parameterization interface is then again in the tunnel mode.

In a further advantageous example, the parameter data specify physical values of device-specific parameters.

In a further advantageous example, the functional modules are sensors or actuators.

In a further advantageous example, a parameterization interface forms a communication interface of the function connection unit for transmitting data, in particular parameter data, control commands for controlling the functional modules or reading data from the functional modules or for controlling the function connection unit or for reading data from the function connection unit.

According to a further aspect, the disclosure relates to a parameter memory having a functional module parameter terminal, which is connectable to a functional module terminal of a function connection unit for functional modules, wherein the parameter memory is configured to provide parameter data for the device-specific parameterization of at least one functional module via the functional module parameter terminal.

In a further advantageous example, the parameter memory is configured to output parameter data for the device-specific parameterization of at least one functional module via the functional module parameter terminal, in particular in response to the reception of a request.

In a further advantageous example, the parameter memory has a functional module according to the single-drop digital communication interface for small sensors and actuators (SDCI) protocol.

In a further advantageous example, the parameter memory is transferable into a transparent mode, in order to set up a direct communication connection between the functional module parameter terminal of the parameter memory and the functional module.

The parameter data can specify the properties of the previously specified parameters.

In a further advantageous example, the parameter memory is configured to set up a data transmission connection for transmitting the previously stored parameter data from the parameter memory to the function connection unit.

This provides the technical advantage that the parameter data are reliably transmitted to the function connection unit. This increases the operational reliability.

In a further advantageous example, the parameter memory is operable in a transparent mode in which data from the function connection via unit can be passed on to the at least one functional module by the parameter memory and/or data can be passed on from the at least one functional module to the function connection unit by the parameter memory. This provides the technical advantage that after a transmission of data, e.g. of functional module parameter data, further data can then be passed on. This does not adversely affect the functionality of the communication system. Therefore, operation of the communication system without difficulties is possible after e.g. new parameter data have been read from the parameter memory. It is therefore not necessary to remove the parameter memory in order to permit operation of the functional module.

In a further advantageous example, the function connection unit is configured to bring about a changeover of a parameter memory, which is in the transparent mode into a memory write mode in which data is writable to the parameter memory.

In a further advantageous example, the parameter memory is configured to interrupt, during the memory write mode, a data transmission connection for transmitting data between the function connection unit and the at least one functional module. This provides the technical advantage that after the reading of the parameter memory the memory of the parameter memory can be used to store further data, e.g. in order to expand a memory of the function connection unit. The memory requirement of the function connection unit is therefore reduced.

In a further advantageous example, the parameter memory has an interface for transmitting data according to a second communication protocol. This provides the technical advantage that data, such as e.g. functional module parameter data, can be written to and/or read from the memory of the parameter memory via a further interface. This increases the ease of handling.

In a further advantageous example, the second communication protocol is a USB protocol. This provides the technical advantage that an interface for transmitting data is provided.

In a further advantageous example, the parameter memory has an operator control element with which transmission of the parameter data from the parameter memory into the function connection unit is triggerable. This provides the technical advantage that an interruption of the data transmission connection can be canceled again so that data can be transmitted again via the data transmission connection from the protocol data set to the function connection unit and vice versa. The parameterization interface is then in the tunnel mode again.

The parameter memory is preferably configured to interact as described with the described function connection unit. Therefore, in further examples the parameter memory has the features of the parameter memory described in conjunction with the function connection unit.

BRIEF DESCRIPTION OF THE DRAWINGS

Examples of the principles of this disclosure are explained with reference to the appended drawings.

FIGS. 3A-3D show a parameterization concept.

DETAILED DESCRIPTION

Figure 1:
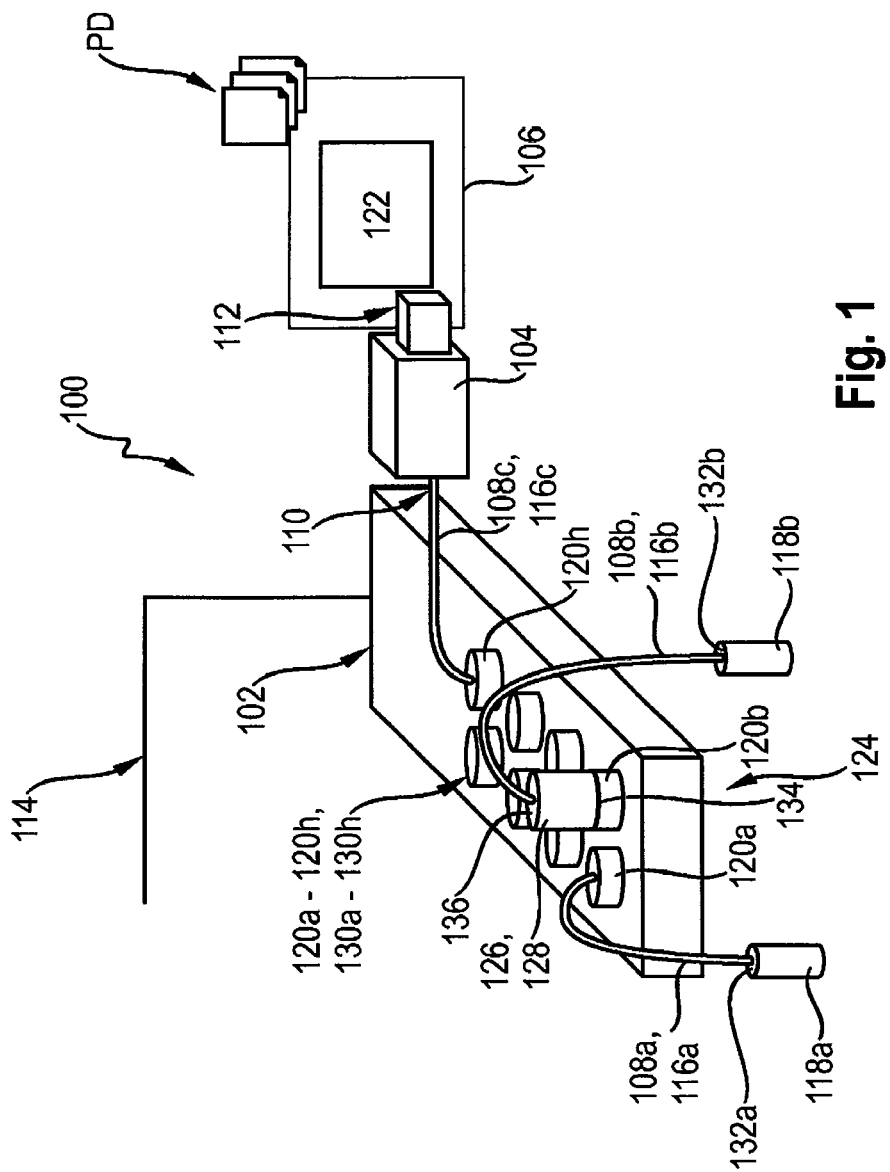
FIG. 1 shows a schematic illustration of a communication system.

FIG. 1 shows a function connection unit 102 in a communication system 100 with an optimal parameterization interface 104, a first functional module 118a, a second functional module 118b and a parameter memory 126.

According to one example, the communication system 100 uses for communication a protocol according to I/O link or SDCI. The I/O link technology provides a point-to-point interface for the functional module terminal of any desired sensor system and actuator system to a control system. The function connection unit 102 can therefore be, for example, an SDCI link master or an I/O link master.

The functional modules 118a, 118b are, for example, actuators or sensors according to the standard IEC 61131-9.

According to one example, the function connection unit 102 is embodied as an I/O link master, the parameterization interface 104 as an I/O link device, the functional module 118a as an SDCI slave or I/O link device, the functional module 118b as an SDCI slave or I/O link device, and the parameter memory 126 as an SDCI slave or I/O link device. The two functional modules 118a, 118b are, according to one example, sensors or actuators, which have or implement, for example, a serial number or parameter data such as e.g. sensitivities, switching delays or characteristic curves, which can be read or written, for example, via the I/O link protocol. According to one example, the I/O link devices or SDCI slaves have for this purpose an additional combined switch state channel and data channel.

According to one example, the communication system 100 is connected or is connectable to a field bus 114. The field bus 114 can be e.g. a PROFIBUS, PROFINET, Interbus, AS-i, EVA-CAT or Powerlink.

According to one example, the function connection unit 102 has functional module terminals 120a-120h, which can be embodied in the present example as I/O ports. According to one example, the functional module terminals 120a-120h are embodied as I/O link- or SDCI-compatible interfaces 130a-130h for communication according to a communication protocol, for example I/O link or SDCI.

A first functional module connecting line 116a is connected to the first functional module terminal 120a and forms a first data transmission connection 108a for transmitting data from and to the first functional module 118a. According to one example, the first functional module connecting line 116a is formed by a standard 3-conductor sensor/actuator cable. Alternatively, this first data transmission connection 108a can be formed in a wireless fashion, e.g. by means of a radio link or by means of an optical waveguide. For connecting the functional module to the first functional module terminal 120a, the first functional module 118a has an interface 132a which is embodied in an I/O link-compatible or SDCI-compatible fashion.

A second functional module terminal 120b of the function connection unit 102 is connected to the parameter memory 126, which is connected via a second data transmission connection 108b, formed by a second functional module connecting line 116b, to the second functional module 118b for the bidirectional transmission of data. According to one example, the second functional module connecting line 116b is formed by a standard 3-conductor sensor/actuator cable. Alternatively, this second data transmission connection 108b can be formed in a wireless fashion, e.g. by means of a radio link or by means of an optical waveguide. For connection to the second functional module terminal 120b, the parameter memory 126 has a functional module parameter terminal 134, which is embodied in an I/O link-compatible or SDCI-compatible fashion. In addition, the second functional module 118b also has an interface 132b which is embodied in an I/O link interface-compatible or SDCI-compatible fashion and is connected to the functional module interface 136 for the parameter memory 126. According to one example, the functional module interface 136 is embodied as an I/O link-compatible or SDCI-compatible interface. The parameter memory 126 has a functional module interface 136 for connecting to an interface 132a, 132b of one of the functional modules 118a, 118b.

The parameter memory 126 has a memory 128 for storing data, for example parameter data of the second functional module 118b. The parameter data can be, for example, specifications relating to the manufacturer, functional module names or a firmware revision status of the second functional module 118b. In addition, the parameter data can specify sensitivities, switching delays, characteristic curves or value ranges of the functional modules 118a, 118b.

The optional parameterization interface 104 is connected to the further functional module terminal 120h. The parameterization interface 104 has a communication terminal 110 in order to form a further, third data transmission connection 108c via a third functional module connecting line 116c to function connection unit 102 for the transmission of data. According to one example, the third functional module connecting line 116c is formed by a standard 3-conductor sensor/actuator cable. Alternatively, this third data transmission connection 108c can be formed in a wireless fashion, e.g. by means of a radio link or by means of an optical waveguide. According to one example, the third data transmission connection 108c is configured for the bidirectional transmission of data. Alternatively, the third data transmission connection 108c can be configured for the unidirectional transmission of data, in order e.g. to permit the reading or receiving of parameter data from setup software 106. For connection of the functional module to the further functional module, terminal 120h the communication terminal 110 is embodied in an I/O link-compatible or SDCI-compatible fashion.

According to one example, the parameterization interface 104 has a parameterization terminal 112 for transmitting data to or communicating with the setup software 106. The parameterization terminal 112 can be configured for bidirectional or for unidirectional transmission of data, in order e.g. to permit reading or receiving of parameter data from or by the setup software 106.

According to one example, the parameterization terminal 112 is embodied as a USB interface, and according to one example the setup software 106 is assigned to a computer, e.g. a personal computer (PC).

According to one example, the setup software 106 is executed on a computer. The setup software 106 has a user interface 122 by means of which the parameter description PD can be displayed. The parameter description PD specifies, for example, parameterizable parameters, which can be parameterized by a user by means of the user interface 122, in order to obtain parameter data. For this purpose, the user can assign, for example, physical values such as sensitivity or reaction time or sensor range to the parameters.

According to one example, the communication terminal 110 is configured to receive the functional module description data according to a second communication protocol. According to one example, the first communication protocol is a communication protocol according to I/O link or SDCI. The parameterization interface 104 thus carries out protocol conversion in order to transmit the functional module description data received according to the second communication protocol to parameterizable functional module terminal 120a-120h according to the first communication protocol.

According to one example, the functional module description data is stored with functional module descriptions by means of the setup software 106, and said data therefore forms the parameter description PD. The functional module descriptions can comprise: information relating to communication properties, information related to functional module parameter data, e.g. sensitivities, switching delays, characteristic curves or value ranges, identification data, process data and diagnostic data, an image and a logo of the manufacturer. Functional module descriptions are also referred to as an I/ODD file (I/O device description) according to the I/O link specification. Said descriptions can be composed of one or more XML files which describe a functional module, such as e.g. the two functional modules 118a, 118b, and an image file in the e.g. PNG format.

According to one example, the functional module description data can correspond to the parameter data.

The user interface 122 forms part of a programming tool, which provides functional module descriptions, that is to say the parameter description PD in a graphic form, to the user, and permits inputs of the user. The programming tool forms the abovementioned setup software 106.

According to one example, the function connection unit 102 has an operator control element 124, which, according to one example, is embodied as a pushbutton key. The function of the operator control unit 124 is explained in more detail below.

Figure 2:
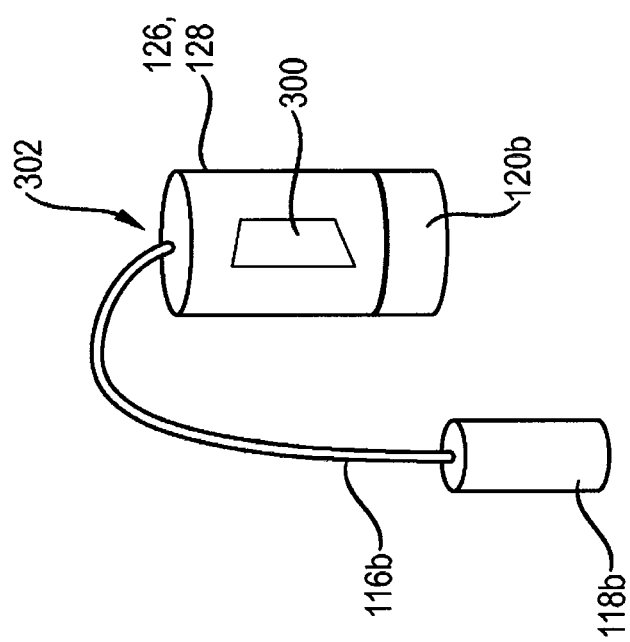
FIG. 2 shows a schematic illustration of a parameter memory.

FIG. 2 shows the parameter memory 126 with the memory 128, connected to the functional module 118b. The parameter memory 126 is also connected to the functional module terminal 120b.

According to one example, the parameter memory 126 has an interface 300. The interface 300 cannot be embodied to be communication-system-compatible with the communication system 100. Therefore, according to one example, the communication terminal 110 and the interface 300 are embodied in different ways.

According to one example, the interface 300 is embodied as a USB interface.

Data, for example parameter data, can be written to the memory 128 via the interface 300. In addition, according to one example, the parameter memory 126 can have an operator control element 302 which, according to one example, is embodied as a pushbutton key. According to one example, transmission of the parameter data from the setup software 106 into the function connection unit 102 is triggerable by activating the operator control element 302.

After the parameter data has been transmitted into the function connection unit 102, the parameter memory 126 can be operated in a transparent mode during which the parameter memory 126 passes on data from the function connection unit 102 to the functional module 118b connected to the parameter memory 126, and/or data from the functional module 118b connected to the parameter memory 126 to the function connection unit 102. Therefore, during the operation of the communication system 100, data is transmitted e.g. from the functional module 118b embodied as a sensor via the data transmission connection 108b, in the form of the functional module connecting line 116b, through the parameter memory 126 to the functional module terminal 120b of the function connection unit 102 and passed on from there via the field bus 114.

After the transmission of the parameter data into the function connection unit 102, according to one example the parameter memory 126 can be operated in a memory write mode during which data is written to the memory 128 by the function connection unit 102. In order to bring about the changeover into the memory write mode from the transparent mode, after the transmission of the functional module description data into the function connection unit 102, the function connection unit 102 transmits a wake-up signal to the parameter memory 126. Therefore, after the transmission of the parameter data PD into the function connection unit 102, the parameter memory 126 is operated in a memory write mode during which data is written to the memory 128 by the function connection unit 102, with the result that an extended memory is provided to the function connection unit 102 during the operation of the communication system 100.

In order to rule out a collision of data on the functional module connecting line 116b which forms the data transmission connection 108b, during the memory write mode the data transmission connection 108b of the parameter memory 126 is interrupted with the functional module 118b. Subsequently, a changeover from the memory write mode into the transparent mode can take place so that data can be transmitted again from the second functional module 118b to the function connection unit 102 and vice versa.

Therefore, it is e.g. possible, after the replacement of a defective functional module 118a, 118b, such as e.g. a defective sensor, by additionally intermediately connecting the parameter memory 126 between the assigned functional module terminal 120a-120h and the replaced functional module 118a, 118b, to transmit updated parameter data into the function connection unit 102 and change a parameter data which has e.g. already been set via the field bus 114, e.g. by overwriting. The parameter data, which is to be newly uploaded, can be transmitted here into the memory 128 of the parameter memory 126 via the interface 300 of the parameter memory 126.

A parameterization concept is illustrated in FIGS. 3A-3D on the basis of the function connection unit 102.

FIG. 3A shows a parameter list 104 with parameters such as, for example, resolution or physical units. The parameter list 401 is converted into parameter data, which is loaded into the parameter memory 126, for example, by an operator by means of a computer on which the setup software 403 illustrated in FIG. 3B is run. The setup software 403 can also implement, for example, the user interface 122. Subsequently, the parameter memory 126 can be operated on one of the functional module terminals 120a-120h of the function connection unit 102. As illustrated in FIG. 3C, the parameter data 405 can specify parameterization for one or more functional modules 118a, 118b, such as, for example, physical values of the device-specific parameters.

FIG. 3D illustrates an exemplary structure of the function connection unit 102. The function connection unit 102 comprises a field bus slave functionality 407 for communication via the field bus 114. The field bus slave functionality 407 can be used, for example, as field bus slave software. The function connection unit 102 also comprises a parameterization function 409 for the device-specific parameterization of the functional modules 118a, 118b. The function connection unit 102 also comprises an administration functionality 411, which administers the function connection unit 102. The administration functionality 411 can be implemented by an I/O link master software, for example in the case of an implementation of an I/O link master by the function connection unit 102.

LIST OF REFERENCE NUMBERS 100 communication system
102 function connection unit
104 parameterization interface
106 setup software, programming tool
108a data transmission connection
108b data transmission connection
108c data transmission connection
110 communication terminal
112 parameterization terminal
114 field bus
116a functional module connecting line
116b functional module connecting line
116c functional module connecting line
118a functional module
118b functional module
120a functional module terminal
120b functional module terminal
120c functional module terminal
120d functional module terminal
120e functional module terminal
120f functional module terminal
120g functional module terminal
120h functional module terminal
122 user interface
124 operator control element
126 parameter memory
128 memory
130a interface
130b interface
130c interface
130d interface
130e interface
130f interface
130g interface
130h interface
132a interface
132b interface
134 functional module parameter terminal
136 functional module interface
300 interface
302 operator control element
PD parameter description
401 parameter list
403 setup software
405 parameter data
407 field bus slave functionality
409 parameterization function
411 administration functionality

What is claimed is:

1. A function connection unit for connecting functional modules, comprising:
a plurality of functional module terminals configured to connect to the functional modules and to communicate according to a first communication protocol; and
a parameter memory comprising a first set of parameter data for device-specific parameterization of at least a first functional module of the functional modules and a second set of parameter data for device-specific parameterization of a second functional module of the functional modules, wherein the parameter memory is configured to connect to a first functional module terminal of the plurality of functional module terminals and output to the functional module terminal a characteristic signal that identifies the parameter memory as a different type of device than the functional modules;
wherein the function connection unit is configured to:
differentiate the parameter memory from a functional module based at least in part on the characteristic signal;
connect to the first functional module and the second functional module;
read the first set of parameter data and the second set of parameter data from the parameter memory and parameterize at least the first functional module and the second functional module in a device-specific fashion based at least in part on the read first set of parameter data and the read second set of parameter data.

2. The function connection unit of claim 1, wherein the function connection unit is a master according to the single-drop digital communication interface for small sensors and actuators (SDCI) protocol.

3. The function connection unit of claim 1, wherein the parameter memory is configured to transmit the first set of parameter data and the second set of parameter data from the parameter memory to the function connection unit via the first functional module terminal.

4. The function connection unit of claim 1, further configured to store the read parameter data.

5. The function connection unit of claim 4, wherein the parameter memory is detachable from the first functional module terminal, wherein the first functional module is configured to electrically connect to the first functional module terminal and the second functional module is configured to electrically connect to a second functional module terminal of the plurality of functional module terminals, and wherein the function connection unit is configured to parameterize the first functional module and the second functional module in the device-specific fashion using the first set of parameter data and the second set of parameter data stored in the function connection unit, and the first functional module and the second functional module are respectively connected to the first functional module terminal and the second functional module terminal instead of the parameter memory.

6. The function connection unit of claim 1, wherein the first functional modules is configured to plug in to the parameter memory, and wherein the function connection unit is configured to parameterize, in the device-specific fashion based at least in part on the first set of parameter data, at least the first functional module via the first functional module terminal that is electrically connected to the parameter memory.

7. The function connection unit of claim 6, wherein the parameter memory is switched into a transparent mode, wherein data from the function connection unit is passed onto the first functional module via the parameter memory in the transparent mode, or data is passed on from the first functional module to the function connection unit by the parameter memory in the transparent mode to parameterize in the device-specific fashion the first functional module connected to the parameter memory, or some combination thereof.

8. The function connection unit of claim 1, wherein the function connection unit is configured to switch the parameter memory into a memory write mode, wherein data is writable to the parameter memory in the memory write mode.

9. The function connection unit of claim 1, wherein the parameter memory comprises an interface for transmitting data according to a second communication protocol.

10. The function connection unit of claim 1, wherein the parameter memory comprises an operator control element configured to trigger a transmission of the parameter data from the parameter memory into the function connection unit.

11. The function connection unit of claim 1, wherein the parameter data specify physical values of device-specific parameters.

12. The function connection unit of claim 1, wherein a parameterization interface forms a communication interface of the function connection unit configured to transmit data.

13. A parameter memory comprising:
a memory configured to store a first set of parameter data for device-specific parameterization of a first functional module and a second set of parameter data for device-specific parameterization of a second functional module;
a functional module parameter terminal configured to:
connect to a functional module terminal of a function connection unit for functional modules, wherein the parameter memory is configured to output a characteristic signal that identifies the parameter memory as a different types of device than the functional modules;
output the first set of parameter data for the device-specific parameterization of the first functional module and the second set of parameter data for the device-specific parameterization of the second functional module via the functional module parameter terminal, and wherein the characteristic signal differentiates the parameter memory from a functional module.

14. The parameter memory of claim 13, wherein the parameter memory is configured to output the first set of parameter data for the device-specific parameterization of the first functional module or the second set of parameter data for the device-specific parameterization of the second functional module via the functional module parameter terminal in response to a reception of a request.

15. The parameter memory of claim 13, wherein the parameter memory comprises a functional module according to a single-drop digital communication interface for small sensors and actuators (SDCI) protocol.

16. The parameter memory of claim 15, wherein the parameter memory is changed into a transparent mode to set up a direct communication connection between the functional module parameter terminal of the parameter memory and the functional module.

17. The function connection unit of claim 2, wherein the master is an I/O link master.

18. The function connection unit of claim 9, wherein the second communication protocol is a Universal Serial Bus (USB) protocol.

19. The function connection unit according to claim 12, wherein transmitting data comprises transmitting one of: parameter data, control commands, or a combination thereof; and wherein the control commands control one of: the functional modules, the function connection unit, read out data from the functional modules, read out data from the function connection unit, or some combination thereof.

* * * * *